May 25, 1948.　　　　E. VUNOVICH　　　　2,442,154
FOLDABLE CABINET
Filed April 19, 1946
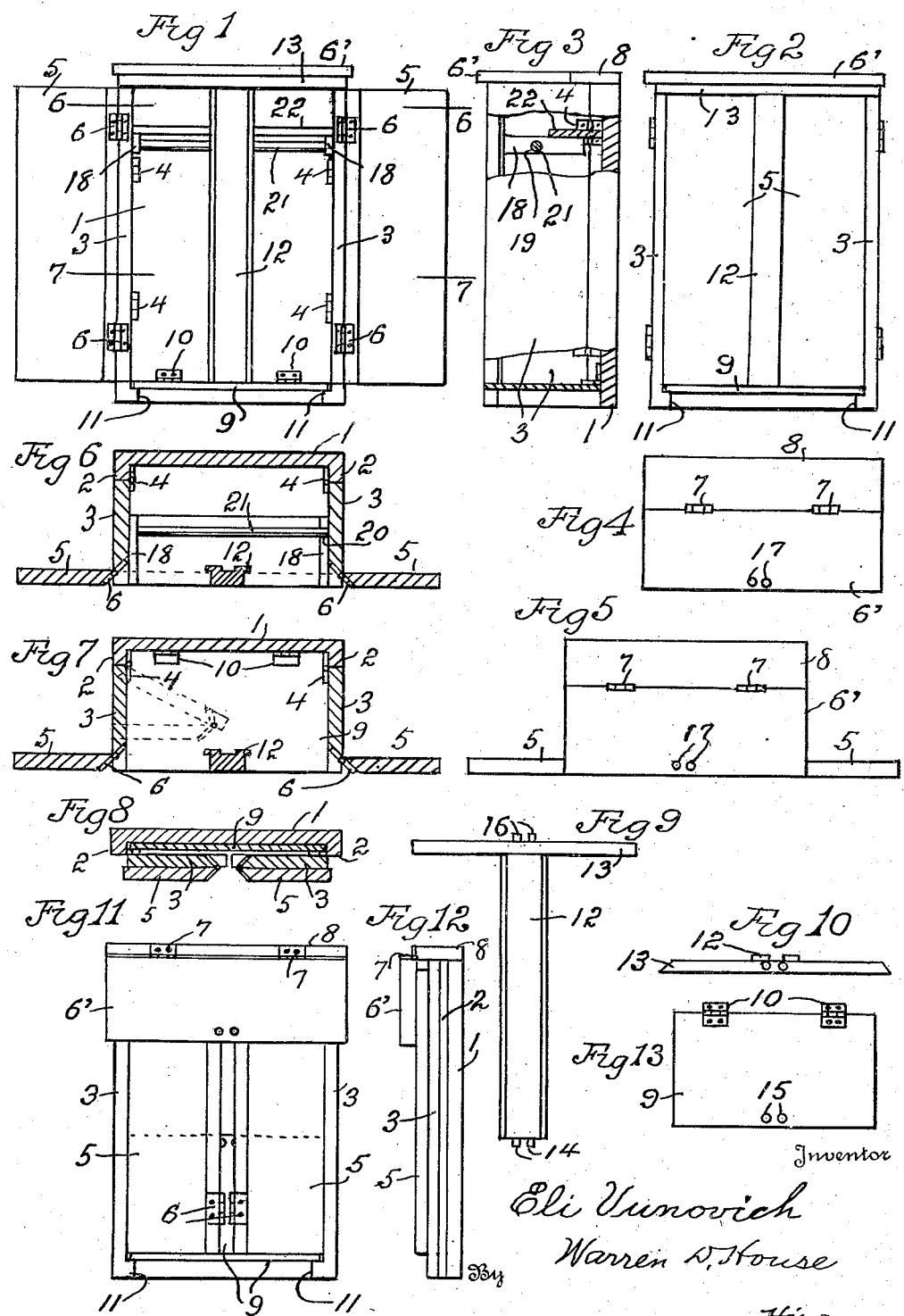
Inventor
Eli Vunovich
Warren D. House
His Attorney Patented May 25, 1948

2,442,154

UNITED STATES PATENT OFFICE 2,442,154

FOLDABLE CABINET

Eli Vunovich, Kansas City, Mo.

Application April 19, 1946, Serial No. 663,503

2 Claims. (Cl. 312—144)

My invention relates to improvements in foldable cabinets.

The object of my invention is the provision of a novel foldable cabinet comprising parts which can be assembled to form a cabinet for the reception of desired articles to be stored, or which can be collapsed into compact folded form; which is cheap, strong, durable, not likely to get out of order, and which is efficient in its operation.

The novel features of my invention are hereinafter fully described and claimed.

In the accompanying drawings, which illustrate the preferred embodiment of my invention, Fig. 1 is a front elevation of the cabinet, shown assembled ready for use, the doors being shown opened.

Fig. 2 is a view similar to Fig. 1, the doors being shown closed.

Fig. 3 is a side elevation of what is shown in Figs. 1 and 2, portions being broken away to show the interior.

Fig. 4 is a top view of what is shown in Fig. 2.

Fig. 5 is a top view of what is shown in Fig. 1.

Fig. 6 is a section on the line 6—6 of Fig. 1.

Fig. 7 is a section on the line 7—7 of Fig. 1.

Fig. 8 is a horizontal section of the cabinet, showing the bottom member, side members and doors folded.

Fig. 9 is a front elevation of the T-shaped door stop and bracing member.

Fig. 10 is a top view of what is shown in Fig. 9.

Fig. 11 is a front elevation showing the cabinet folded.

Fig. 12 is a side elevation of what is shown in Fig. 11.

Fig. 13 is a plan view of the bottom member.

Similar characters of reference designate similar parts in the different views.

1 designates a vertical back member adapted to rest at its lower end upon the floor, and having at its side edges two forwardly extending vertical portions 2. Two side members 3 have their rear edges respectively pivoted on vertical axes by hinges 4 to the inner sides of said portions 2, so as to swing from a forwardly extending position, shown in Figs. 1, 3, 6 and 7, to a folded position in front of the back member 1, as shown in Figs. 8, 11 and 12. The members 3 have their lower ends on the floor.

Two doors 5 have one set of their vertical edges pivoted on vertical axes by hinges 6 to the free vertical edges of the side members 3, so as to swing from the closed position, shown in Fig. 2, to positions flatwise against the outer sides of the side members 3, as shown in Figs. 8, 11 and 12.

A top has a horizontal rear member fastened to the upper end of the back member 1. Said top has also a front member 6' pivoted by hinges 7 on horizontal axes to the front edge of the rear top member, designated by 8, so as to swing from the operative horizontal position, shown in Figs. 1 and 4, to a downwardly extending position, shown in Figs. 11 and 12, when the side members 3 and the doors 5 are folded.

A flat bottom member 9 is pivoted on horizontal axes by hinges 10 at its rear edge to the front side of the back member 1, so as to swing from a forwardly extending horizontal position, shown in Figs. 1 and 6 to a folded vertical position, shown in Figs. 8 and 11. Inwardly extending projections 11 on the side members 3 support the bottom member 9 in the operative horizontal position, Figs. 1 and 11.

A removable T-shaped member having a vertical portion 12 and an upper transverse portion 13, serves as a door stop and bracing member, which rests at its lower end on the bottom member 9 and has its upper end supporting the front top member 6' horizontally, has its transverse portion 13 adapted to bear at its ends against the front edges of the side members 3 above the doors 5, Figs. 1 and 2, so as to hold said side members 3 in the forwardly extending position.

The lower end of the portion 12 has two downwardly extending pins 14, which extend into two holes 15 in the bottom member 9, Fig. 13. The upper side of the T-shaped member has two upwardly extending pins 16 which extend into two holes 17 in the front top member 6', Figs. 4 and 5.

Two horizontal cleats 18 are fastened to the inner sides of the side members 3, one cleat having a transverse hole 19, and the upper side of the other cleat having a notch 20 adapted to receive one end of a cross bar 21, the other end of which is fitted in the hole 19. A shelf 22 is removably mounted at its ends on the cleats 18.

In assembling the cabinet in operative condition, the side members 3 are swung to the forwardly extending position, and the bottom member 9 is swung onto the projections 11. The front top member 6' is swung upwardly to the horizontal, and the T shaped member 12—13 is mounted on the bottom member 9 and under the front top member 6, with its transverse portion 13 bearing against the front edges of the side members 3, thus holding the parts in operative positions.

Many modifications of my invention, within the scope of the appended claims, may be made without departing from the spirit of my invention.

What I claim is:

1. In a foldable cabinet, the combination with a vertical back member having its lower end adapted to rest on a floor, of a bottom member hinged on a horizontal axis at its rear edge to the front of said back member to swing from a forwardly extending operative position to a vertical folded position, two side members hinged on vertical axes to the side edges respectively of said back member, to swing inwardly from operative forwardly extending positions to positions in front of and parallel with said back member and adapted to rest on their lower edges on the floor and having means, when forwardly extended, for supporting said bottom member horizontally, two doors hinged on vertical axes to the front edges respectively of said side members, so as to swing from a closed position over said bottom member, when the latter is horizontal, to folded positions against the outer sides of said side members and to swing with said side members to positions folded in front of said back member, a top having a horizontal rear member fastened to the upper end of said back member, said top having a front member hinged on a horizontal axis at its rear edge to said rear top member so as to swing from a horizontal operative position to a downwardly extending position in front of said doors and side members when folded, and a removable T-shaped door stop and bracing member having at its upper end means for engaging the under side of said front top member and supporting it horizontally and having means at its lower end for engaging the upper side of said bottom member for holding the latter from upward movement and having the ends of its transverse portion adapted to respectively engage the front edges of said side members for holding them in the forwardly extending positions, and elements cooperating with said means at the upper and the lower ends of said T-shaped members enabling them to perform their said functions.

2. In a foldable cabinet, the combination with a vertical back member having its lower end adapted to rest on a floor, of a bottom member hinged on a horizontal axis at its rear edge to the front of said back member to swing from a forwardly extending operative position to a vertical folded position, two side members hinged on vertical axes to the side edges respectively of said back member, to swing inwardly from operative forwardly extending positions to positions in front of and parallel with said back member and adapted to rest on their lower edges on the floor and having means, when forwardly extended, for supporting said bottom member horizontally, two doors hinged on vertical axes to the front edges respectively of said side members, so as to swing from a closed position over said bottom member, when the latter is horizontal, to folded positions against the outer sides of said side members and to swing with said side members to positions folded in front of said back member, a top having a horizontal rear member fastened to the upper end of said back member, said top having a front member hinged on a horizontal axis at its rear edge to said rear top member so as to swing from a horizontal operative position to a downwardly extending position in front of said doors and side members when folded, a removable T-shaped door stop and bracing member having at its upper end means for engaging the under side of said front top member and supporting it horizontally and having means at its lower end for engaging the upper side of said bottom member for holding the latter from upward movement and having the ends of its transverse portion adapted to respectively engage the front edges of said side members for holding them in the forwardly extending positions, two cleats respectively horizontally fastened to the inner sides of said side members in the same horizontal plane spaced from said top, one cleat having a transverse hole, the other cleat having in its upper side a notch, a horizontal transverse bar having one end fitted in said hole and its other end in said notch, and a shelf removably mounted at its ends respectively on said cleats, and elements cooperating with said means at the upper and the lower ends of said T-shaped members enabling them to perform their said functions.

ELI VUNOVICH.

REFERENCES CITED

The following references are of record in the file of this patent:

UNITED STATES PATENTS

| Number | Name | Date |
| --- | --- | --- |
| 728,673 | Clay | May 19, 1903 |
| 835,902 | Damato | Nov. 13, 1906 |
| 1,559,878 | Humphreys | Nov. 3, 1925 |